United States Patent [19]

Shain

[11] 4,363,892
[45] Dec. 14, 1982

[54] THERMOPLASTIC COPOLYESTER ELASTOMERS MODIFIED WITH SALTS OF PHENOLIC COMPOUNDS

[75] Inventor: Albert L. Shain, Wilmington, Del.

[73] Assignee: E. I. Du Pont de Nemours and Company, Wilmington, Del.

[21] Appl. No.: 355,169

[22] Filed: Mar. 5, 1982

[51] Int. Cl.³ .......................... C08K 5/05; C08K 5/13
[52] U.S. Cl. ................................ 524/327; 524/539; 525/442
[58] Field of Search ................ 524/327, 539; 525/442

[56] References Cited

U.S. PATENT DOCUMENTS

| | | | |
|---|---|---|---|
| 3,644,295 | 2/1972 | Stewart et al. | 524/323 |
| 3,651,014 | 3/1972 | Witsiepe | 528/305 |
| 3,763,109 | 10/1973 | Witsiepe | 528/305 |
| 3,766,146 | 10/1973 | Witsiepe | 260/75 R |
| 3,957,706 | 5/1976 | Light et al. | 260/22 R |
| 4,010,222 | 3/1977 | Shih | 260/873 |
| 4,205,158 | 5/1980 | Hoeschele | 528/300 |
| 4,281,099 | 7/1981 | Maresca | 528/176 |

*Primary Examiner*—Lucille M. Phynes

[57] ABSTRACT

A thermoplastic copolyester elastomer composition comprising a copolyester consisting essentially of a multiplicity of long-chain ester units and short-chain ester units joined through ester linkages, said long-chain ester units being represented by the formula (Ia), formula (Ib) and combinations thereof

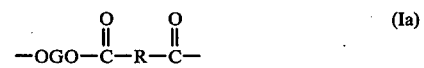

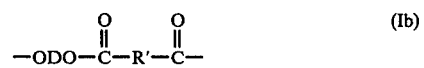

and said short-chain ester units being represented by formula (II)

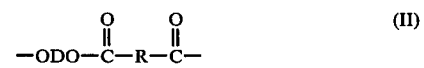

where G is a divalent radical remaining after the removal of hydroxyl groups from at least one long-chain glycol having a melting point of less than about 55° C. and a number average molecular weight of about 400–4000, R is a divalent radical remaining after the removal of carboxyl groups from at least one dicarboxylic acid having a molecular weight less than about 300, R' is a divalent radical remaining after the removal of carboxyl groups from dimer acid, D is a divalent radical remaining after the removal of hydroxyl groups from at least one aliphatic diol having a molecular weight less than about 250, with the proviso that at least about 70 mole percent of the D radicals are either ethylene radicals or 1,4-butylene radicals and at least about 70 mole percent of the R radicals are 1,4-phenylene radicals, said short-chain ester units being present in an amount of about 15–95 percent by weight of said copolyester; and about 0.1–10 percent by weight, based on the weight of the total composition, of at least one alkali metal salt of a phenolic compound having a $pK_a$ 25° greater than 5 and an equivalent weight of less than about 300 per phenolic hydroxyl group.

9 Claims, No Drawings

THERMOPLASTIC COPOLYESTER ELASTOMERS MODIFIED WITH SALTS OF PHENOLIC COMPOUNDS

BACKGROUND OF THE INVENTION

This invention is directed to a novel thermoplastic copolyester elastomer composition that is modified by alkali metal salts of phenolic compounds.

Thermoplastic copolyester elastomers form a highly useful class of polymers because of their outstanding physical properties. However, it is known that copolyester elastomer compositions generally are not particularly suitable for blow molding because of their low melt strengths. Furthermore, copolyester elastomers containing ethylene terephthalate ester units are known to process poorly because of their slow hardening rate. This problem of hardening rate also exists for soft copolyester elastomers containing a low percentage of butylene terephthalate ester units.

To attempt to overcome these problems, a variety of compounds have been added to the copolyester elastomers. For example, the sodium salts of monocarboxylic acids, such as sodium stearate, can be added to the polymer to increase melt strength and also to increase hardening rate. However, the melt stability of these compositions at processing temperatures is adversely affected, as indicated by a rapid increase in melt index. It is also known to use salts of polymeric carboxylic acids, such as ethylene/methacrylate acid ionomers, as agents to improve the melt strength of copolyesters. These materials serve as nucleating agents in copolyesters with no detrimental effect on melt stability. However, copolyester blends with the ionomer have been found to exhibit phase separation, resulting in the formation of layers when the blend is used in high shear processing techniques such as injection molding or injection blow molding. The resulting layers separate from one another (delaminate) when such nonhomogeneous articles are flexed or stretched, for example. Obviously, such performance is generally unacceptable.

The present invention describes a copolyester elastomer composition that overcomes the above-mentioned deficiencies. The novel composition is blow moldable, melt stable, and hardens rapidly from the melt. It does not exhibit phase separation in high shear processing techniques including injection molding and injection blow molding.

SUMMARY OF THE INVENTION

It has now been discovered that a thermoplastic copolyester elastomer composition modified with an alkali metal salt of a phenolic compound has excellent injection molding and blow molding characteristics, coupled with good melt stability at processing temperatures. More specifically, this invention is directed to a thermoplastic copolyester elastomer composition comprising (A) a copolyester consisting essentially of a multiplicity of long-chain ester units and short-chain ester units joined through ester linkages, said long-chain ester units selected from the group consisting of units represented by formula (Ia), formula (Ib), and combinations thereof

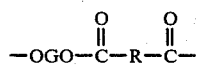
(Ia)

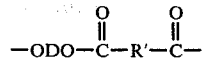
(Ib)

and said short-chain ester units being represented by formula (II)

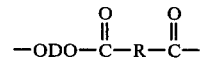
(II)

where G is a divalent radical remaining after the removal of hydroxyl groups from at least one long-chain glycol having a melting point of less than about 55° C. and a number average molecular weight of about 400–4000, R is a divalent radical remaining after removal of carboxyl groups from at least one dicarboxylic acid having a molecular weight of less than about 300, R' is a divalent radical remaining after the removal of carboxyl groups from dimer acid, and D is a divalent radical remaining after the removal of hydroxyl groups from at least one aliphatic diol having a molecular weight of less than about 250, with the proviso that at least about 70 mole percent of the D radicals are either ethylene radicals or 1,4-butylene radicals and at least about 70 mole percent of the R radicals are 1,4-phenylene radicals, said short-chain ester units being present in an amount of 15–95% by weight of said copolyester; and (B) about 0.1 to 10% by weight based on said copolyester of at least one alkali metal salt of a phenolic compound having an ionization constant of less than about $1 \times 10^{-5}$ and an equivalent weight of less than about 300 per phenolic hydroxyl group.

The alkali metal salt of the phenolic compound can be melt blended with the copolyester with suitable mixing devices. The salt of the phenolic compound renders the copolyester elastomer injection moldable and blow moldable to form shaped articles while, at the same time, the melt stability of the copolyester is retained.

DETAILED DESCRIPTION OF THE PREFERRED EMBODIMENTS

The instant invention comprises novel thermoplastic copolyester elastomer compositions obtained by admixing the elastomer with at least one alkali metal salt of a phenolic compound.

The thermoplastic copolyester elastomers consist essentially of repeating long-chain ester units and short-chain ester units, as previously described hereinabove. The term "long-chain ester units" refers to the reaction product of a long-chain glycol with a dicarboxylic acid [Formula (Ia)] and/or to the reaction product of dimer acid with a low molecular weight diol [Formula (Ib)]. "Long-chain ester units" which correspond to Formula (Ia) above require the use of a long-chain glycol. The long-chain glycols used to prepare the copolyesters have a number average molecular weight of about 400–4000 and a melting point less than about 55° C. Long-chain glycols that can be used for preparing polymers of this invention include the poly(alkylene oxide) glycols where the alkylene is $C_2$–$C_8$, such as poly(ethylene oxide) glycol, poly(1,2- and 1,3-propylene oxide) glycol, poly(tetramethylene oxide) glycol, poly(pentamethylene oxide) glycol, poly(octamethylene oxide) glycol, and poly(1,2-butylene oxide) glycol; random or block copolymers of ethylene oxide and 1,2-propylene oxide; and polyformals prepared by reacting formaldehyde with glycols, such as pentamethylene glycol, or mixtures of glycols, such as a mixture of tetramethylene and pentamethylene glycols. Other satisfactory long-chain polymeric glycols include polybutadiene or polyisoprene glycols, copolymers of these, and saturated hydrogenated products of these materials. Preferred long-chain glycols are poly(tetramethylene oxide) glycol having a number average molecular weight of 600–2000 and ethylene oxide-capped poly(propylene oxide) glycol having a number average molecular weight of 1500–2800 and containing 15–35% by weight ethylene oxide.

The term "long chain ester units" also applies to units having Formula (Ib) which are reaction products of dimer acid having a molecular weight of about 565 with a low molecular weight diol. Dimer acid is the dimerization product of unsaturated $C_{18}$ fatty acids such as linoleic and linolenic acid or esters thereof. The preparation and structure of the dimerized fatty acid is described in J. Am. Chem. Soc. 66,84 (1944) and in U.S. Pat. No. 2,347,562, both of which are herein incorporated by reference. Several grades of dimer acids which vary in the degree of unsaturation and monomer and trimer content are available from commercial sources. The preferred dimer acid compositions are substantially free of monomer and trimer fractions and are fully saturated. A high quality grade of dimer acid meeting these requirements is commercially available under the trade name "Empol" 1010 from Emery Industries, Inc. Lower grades of dimer acid containing a low level of unsaturation and trimer—as represented by "Empol" 1014—are also suitable for the preparation of the copolyesters of this invention. In this case it is advantageous to compensate for the trimer content of the dimer acid—which should not exceed 15% by weight—by using an equivalent amount of monofunctional fatty acid or long chain alcohol as a polymerizaton modifier to prevent the formation of highly branched or crosslinked polymers. Representative monofunctional fatty acids are stearic and palmitic acid; long chain alcohols include lauryl and octadecyl alcohol. Principally, any monofunctional carboxylic acid or alcohol can be used in melt condensation polymerizations as long as its vapor pressure is substantially lower than that of the particular low molecular glycol employed.

The short chain ester units represented by Formula (II) are the products of the reaction of a low molecular weight diol and a dicarboxylic acid. At least 70 mole percent of the short-chain ester units are either ethylene terephthalate or 1,4-butylene terephthalate resulting from the reaction of ethylene glycol or 1,4-butanediol with terephthalic acid. Low molecular weight diols (other than ethylene glycol or 1,4-butanediol) which react to form short-chain ester units are aliphatic diols having molecular weights of less than about 250. The term aliphatic diols as used herein should be construed to include cycloaliphatic diols. Usually diols having 3–15 carbon atoms can be used. Representative diols include propylene, pentamethylene, 2,2-dimethyltrimethylene, hexamethylene, and decamethylene glycols, dihydroxy cyclohexane, cyclohexane dimethanol, etc. and mixtures thereof. Aliphatic or cycloaliphatic diols having unsaturation, such as 1,4-butene-2-diol and 1,4-cyclohexene-2-diol can also be used although some homopolymerization of these monomers generally occurs during polycondensation. Equivalent ester forming derivatives of diols are also useful, for example, ethylene oxide or ethylene carbonate can be used in place of ethylene glycol. The term "low molecular weight diols" as used herein should be construed to include such equivalent ester-forming derivatives; provided, however, that the molecular weight requirement pertains to the diol only and not to its derivatives.

Dicarboxylic acids (other than terephthalic acid) which can be reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring. When more than one ring is present, they can be joined by aliphatic or aromatic divalent radicals or divalent radicals such as —O— or —$SO_2$—.

Representative aliphatic and cycloaliphatic dicarboxylic acids that can be used in this invention in combination with terephthalic acid are sebacic acid, 1,3-cyclohexane dicarboxylic acid, 1,4-cyclohexane dicarboxylic acid, 4-cyclohexene-1,2-dicarboxylic acid, adipic acid, glutaric acid, succinic acid, carbonic acid, oxalic acid, azelic acid, diethyldicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids (other than terephthalic acid) which can be used include phthalic and isophthalic acids, bibenzoic acid, substituted dicarboxy compounds with two benzene nuclei such as bis(p-carboxylphenyl)methane, p-oxy-(p-carboxylphenyl) benzoic acid, ethylene-bis(p-oxybenzoic acid), 1,5-naphthalene dicarboxylic acid, 2,6-naphthalene dicarboxylic acid, anthracene dicarboxylic acid, 4,4'-sulfonyl dibenzoic acid, and $C_1$-$C_{12}$ alkyl and ring substitution derivatives thereof, such as halo, alkoxy, and aryl derivatives. Hydroxyl acids such as p($\beta$-hydroxyethoxy)benzoic acid can also be used providing an aromatic dicarboxylic acid is also present.

As acids used in addition to terephthalic acid, aromatic dicarboxylic acids are a preferred class for preparing the copolyester polymers of this invention. Among the aromatic acids, those with 8–16 carbon atoms are preferred, particularly the phenylene dicarboxylic acids, i.e., phthalic and isophthalic acids.

In order to insure that at least 70 mole percent of the short chain ester units are either ethylene terephthalate or 1,4-butylene terephthalate units, at least about 70 mole percent of the dicarboxylic acid incorporated into the polymer is terephthalic acid and at least about 70 mole percent of the low molecular weight diol incorporated into the polymer is ethylene glycol or 1,4-butanediol and the sum of the percentage of the R groups that are not 1,4-phenylene radicals and the percentage of the D groups that are not ethylene or 1,4-butylene radicals does not exceed about 30 mole percent. This means that 70% of the total R groups in Formula (Ia) and Formula (II) above are 1,4-phenylene radicals. At least about 70% of the D groups in Formula (Ib) and Formula (II) above are ethylene radicals or 1,4-butylene radicals (derived from ethylene glycol or 1,4-butanediol). The combination of ethylene glycol and 1,4-butanediol can be used to make the copolyester, as mentioned above, provided that at least about 70 mole percent of the short chain ester units are either ethylene terephthalate or 1,4-butylene terephthalate.

The short-chain ester units constitute about 15–95 weight percent of the copolyester, preferably from about 25–85 weight percent since this results in polymers having a desirable balance of elastomeric properties and toughness. The remainder of the copolyester consists of long-chain ester units [represented by either Formula (Ia) or (Ib) above] comprising about 5–85 weight percent and preferably 15–75 weight percent of the copolyester.

Preferred copolyesters for use in the compositions of this invention are those prepared from dimethyl terephthalate, 1,4-butanediol or ethylene glycol and poly(tetramethylene oxide) glycol having a number average molecular weight of about 600–2000 or ethylene oxide-capped poly(propylene oxide) glycol having a number average molecular weight of about 1500–2800 and an ethylene oxide content of 15–35% by weight. Copolyesters prepared from dimer acid, butanediol and dimethyl terephthalate are also preferred. Optionally, up to about 30 mole percent of the dimethyl terephthalate in these polymers can be replaced by dimethyl phthalate or dimethyl isophthalate.

The dicarboxylic acids or their derivatives and the polymeric glycol and/or dimer acid are incorporated into the copolyester in the same molar proportions as are present in the reaction mixture. The amount of low molecular weight diol actually incorporated corresponds to the difference between the moles of diacids and polymeric glycol present in the reaction mixture. When no polymeric glycol is used, the amount of low molecular weight diol incorporated corresponds to the moles of diacids employed. When mixtures of low molecular diols are employed, the amount of each diol incorporated is largely a function of the molar proportions of the diols present, their boiling points, and relative reactivities. The total amount of diol incorporated is still the difference between moles of diacid and polymeric glycol.

The copolyesters described herein are made by a conventional ester interchange reaction which, preferably, takes place in the presence of an antioxidant. A preferred procedure involves heating the dimethyl ester of terephthalic acid with a long-chain glycol and/or dimer acid and 1,4-butanediol in a molar excess in the presence of a catalyst at about 150°–260° C. and a pressure of 0.05 to 0.5 MPa, preferably ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyester by distillation of the excess of short-chain diol. The second process stage is known as "polycondensation."

Additional ester interchange occurs during this polycondensation which serves to increase the molecular weight and to randomize the arrangement of the copolyester units. Best results are usually obtained when this final distillation or polycondensation is run at less than about 670 Pa, preferably less than about 250 Pa, and about 200°–280° C., preferably about 220°–260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium acetate or calcium acetate are preferred. The catalyst should be present in the amount of about 0.005 to 2.0 percent by weight based on total reactants.

Both batch and continuous methods can be used for any stage of copolyester polymer preparation. Further polycondensation of lower molecular weight polymers can also be accomplished in the solid phase by heating divided solid polymer particles in a vacuum or in a stream or inert gas to remove liberated low molecular weight diol. This method has the advantage of reducing thermal degradation because it must be used at temperatures below the softening point of the polymer.

A detailed description of suitable copolyesters that can be used in the invention and procedures for their preparation are described in U.S. Pat. Nos. 3,023,192; 3,651,014; 3,763,109; 3,766,146; and 4,205,158, the disclosures of which are incorporated herein by reference.

The alkali metal salts of phenolic compounds that are added to the copolyester elastomer to form the improved compositions of this invention can be prepared from a wide variety of phenolic compounds. The term "phenolic compound" is used to designate compounds in which one or more hydroxyl groups are directly linked to a benzene ring or to a fused ring aromatic system such as that of naphthalene, anthracene and phenanthrene. The phenolic compounds should have a $pK_a$ 25° of greater than 5 and an equivalent weight of less than about 300 per phenolic hydroxyl group. The phenolic compounds can be substituted with substituents including alkyl, aryl and halogen groups.

Representative phenolic compounds include phenol, o-cresol, m-cresol, p-chlorophenol, p-phenylphenol, p-cyclohexylphenol, p-t-butylphenol, hydroquinone, catechol, resorcinol, pyrogallol, 1,2,4-trihydroxybenzene, phloroglucinol, bisphenol A, 2,2',6,6'-tetrabromobisphenol A, bisphenol AF, 4,4'-dihydroxybiphenyl, 4,4'-methylenebis(phenol), α-naphthol, β-naphthol, di-β-naphthol, 4,4'-dihydroxydiphenyl ester and resorcinol sulfide. Substantially uncrosslinked phenol/aldehyde resins prepared by condensation of phenol or substituted phenols such as cresol or t-butylphenol with lower aldehydes such as formaldehyde and acetaldehyde are also useful. It is preferred that such polymeric phenols have number average molecular weights of less than about 2500. All the phenolic compounds have a $pK_a$ 25° greater than 5. A list of $pK_a$'s for representative phenolic compounds is given in Fieser and Fieser, *Organic Chemistry*, 3rd Ed., 1956, page 624.

Phenolic compounds having only one hydroxyl group are generally less preferred because many of them have strong odors and pose health hazards and pollution problems. For these reasons, polyhydric phenols are preferred for preparing salts for use in the present invention. Polyhydric phenols having an equivalent weight of less than 150 per phenolic hydroxyl group are especially preferred because smaller amounts are required in the form of their salts to bring about the desired modification of the copolyesters.

Preferred phenolic compounds include resorcinol, bisphenol A, phloroglucinol, resorcinol sulfide and phenol-formaldehyde resin. Especially preferred is resorcinol.

The salts of the phenolic compound are readily prepared by adding aqueous or alcoholic solutions of the selected alkali metal hydroxide or alcoholate to a solution or suspension of the phenolic compound in an alcohol, such as methanol, and isolating the resulting salt by evaporation of solvents. Preferably, equivalent amounts of alkali metal hydroxide or alcoholate and phenolic compound are used. Excess alkali metal hydroxide or alcoholate should be avoided.

Although any alkali metal can be used to form the salt, the preferred salts of the phenolic compounds are sodium and potassium salts, with sodium being especially preferred because of its lower atomic weight and its effectiveness in the present compositions. The concentration of salt of phenolic compound that is added to modify the copolyester is about 0.1–10% by weight, preferably 0.5–5% by weight, based on the copolyester. Below about 0.1% the effects of the salt are not significant; above about 10% the physical properties of the copolyester elastomer are adversely affected.

The present compositions can be prepared by blending alkali metal salt of the phenolic compound with the molten copolyester elastomer in high shear mixing equipment such as a screw-type extruder or a Banbury mixer. The temperatures employed will normally be about 20° C. above the melting point of the copolyester.

EXAMPLES

Copolyester A is prepared according to the following procedure: to a flask fitted with a distillation column and a stainless steel stirrer with a paddle cut to conform with the internal radius of the flask and positioned about 3 mm from the bottom of the flask, the following starting materials are charged:

| | |
|---|---|
| poly(tetramethylene oxide) glycol (number average molecular weight 990) | 439 parts |
| dimethyl terephthalate | 748 parts |
| 1,4-butanediol | 400 parts |
| 4,4'-bis(α,α-dimethylbenzyl)-diphenylamine | 12 parts |
| 5 parts tetrabutyl titanate in 95 parts 1,4-butanediol | 100 parts |

The flask is placed in an oil bath at 160° C., agitated for five minutes and then the tetrabutyl titanate/1,4-butanediol solution is added. Methanol distills from the reaction mixture as the temperature is slowly raised to 250° C. over a period of one hour. When the temperature reaches 250° C., the pressure is gradually reduced to about 270 Pa within 20 minutes. The polymerization mass is agitated at 250° C. for 55–90 minutes. The condensation polymerization is discontinued by releasing the vacuum under nitrogen and the resulting viscous molten product is scraped froom the flask in a nitrogen (water and oxygen free) atmosphere and allowed to cool. The resulting polymer has a melt index of 9–11 g/10 min, measured at 230° C. and an acid content of 60 meq/kg[1]. After shredding, the polymer is extruded at 220° C. to a 3–4 mm strand and granulated.

[1]The carboxyl groups content is determined by dissolving the copolyester in o-cresol, adding o-dichlorobenzene, and titrating the solution with standardized ethanolic potassium hydroxide. The end point is determined visually using bromophenol blue as indicator.

Copolyester B is prepared according to the following procedure:

To a flask fitted with a distillation column and a stainless steel stirrer with a paddle cut to conform with the internal radius of the flask and positioned about 3 mm from the bottom of the flask, the following starting materials are charged:

| | |
|---|---|
| dimethyl terephthalate | 802 parts |
| ethylene glycol | 537 parts |
| trimellitic anhydride | 1.82 parts |
| N,N'—trimethylenebis(3,5-di-tert-butyl-4-hydroxy-hydrocinnamamide) | 2.5 parts |
| N,N'—hexamethylenebis(3,5-di-tert-4-hydroxy-hydrocinnamamide | 2.5 parts |
| tetrabutyl titanate | 2.0 parts |

The mixture is heated at such a rate that the temperature at the head of the distillation column is maintained at 70° C. while methanol is removed. When substantially all of the methanol is distilled out of the reaction mixture, the head temperature rises abruptly to about 180° C. Heating and distillation continues until the temperature in the reactor reaches 230° C. The reaction mixture is allowed to cool to 185° C. and 480 parts poly(tetramethylene oxide) glycol having a number average molecular weight of 990 is added. The reaction flask is then immersed in a 250° C. oil bath and the mixture agitated for 5 minutes under nitrogen. While maintaining an oil bath temperature of 250° C., the pressure is step-wise reduced to about 13 Pa and ethylene glycol distillate is collected in a cold trap. After stirring for about 120 minutes, the polycondensation polymerization is discontinued and the product is isolated as described above for Copolyester A. The resulting polymer has a melt index of 15 g/10 min. (measured at 240° C.). After shredding, the polymer is extruded at 240° C. to a 3–4 mm strand and granulated.

Copolyester C is prepared according to the procedure given for the preparation of Copolyester A from the following starting materials:

| | |
|---|---|
| ethylene oxide-capped poly(propylene oxide) glycol (number average molecular weight | 47.8 parts |

-continued

| | |
|---|---|
| 2200, ethylene oxide content 26.3 wt. %) | |
| dimethyl terephthalate | 44.5 parts |
| dimethyl isophthalate | 12.2 parts |
| 1,4-butanediol | 35.0 parts |
| trimellitic anhydride | 0.22 parts |
| N,N'—hexamethylenebis(3,5-di-tert.-butyl-4-hydroxyhydrocinnamamide) | 0.16 parts |
| N,N'—trimethylenebis(3,5-di-tert.-butyl-4-hydroxyhydrocinnamamide) | |
| Bis(1,2,2,6,6-pentamethyl-4-piperidinyl) n-butyl(3,5-di-tert.-butyl-4-hydroxybenzyl)-malonate | 0.5 parts |
| tetrabutyl titanate | 0.2 parts |

The resulting copolyester has a melt index of 10.0 g/10 min. measured at 210° C. and 78.5 mole percent of the short-chain ester units are 1,4-butylene terephthalate.

Mixing Procedure

The present compositions of copolyester A, B or C mixed with the salts are prepared by blending the molten copolyester with the weight percentage of salt as shown in the tables in the examples. The polymer is dried overnight at 75° C. in a vacuum oven with nitrogen gas sweep before use. Melt blending is performed in a Brabender Plastograph fitted with sigma blades and operated at 75 rpm and at a range of temperatures between 220° C. and 240° C. The polymer and salt are added to the Plastograph over the course of about two minutes and mixing is continued for 10 min. Samples for physical testing are prepared by compression molding into 100×130×1.9 mm slabs.

The alkali metal salts of the phenolic compounds are prepared according to the following methods:

To a hot methanolic solution of the phenolic compound of interest is added a hot methanolic solution of the selected alkali metal hydroxide. The solution is stirred and the phenolate salt is isolated by evaporation of the solvent. Equivalent amounts of hydroxide and phenolic compound are used.

Alternatively, an aqueous solution of the alkali metal hydroxide can be mixed with the methanolic solution of the phenolic compound. The solvents are then removed in a rotary evaporator at reduced pressure at about 100° C.

The following ASTM methods are employed in determining the properties of the polymer compositions prepared in the examples which follow:

| | |
|---|---|
| Tensile strength | D412 |
| Elongation at break | D412 |
| Modulus at 100% | D412 |
| Melt flow index | D1238 |

EXAMPLE 1

Sodium salts of dihydric and trihydric phenols are blended with copolyester A according to the mixing procedure described above to give the compositions shown below:

1A Na$_2$(Pyrocatechol), pK$_a$ 25° 9.4+Copolyester A
1B Na$_2$(Resorcinol), pK$_a$ 25° 9.4+Copolyester A
1C Na$_2$(Hydroquinone), pK$_a$ 25° 10+Copolyester A
1D Na$_3$(Pyrogallol), pK$_a$ 25° 7+Copolyester A
1E Na$_3$(1,2,4-trihydroxybenzene), pK$_a$ 25°>5+Copolyester A
1F Na$_3$(Phloroglucinol), pK$_a$ 25° 7+Copolyester A
For Control purposes
1G unneutralized phloroglucinol+Copolyester A
1H Copolyester A subjected to the same mixing cycle in the absence of any modifier.

The resulting compositions are evaluated by measuring the melt flow index at 230° C. and 250° C. and the melt stability index at 250° C. as calculated from the ratio of melt indices after 5 minutes and 30 minutes residence time in the melt indexer (perfect stability: ratio=1).

Additionally, each composition is characterized by thermal analysis using a Differential Scanning Calorimeter (Du Pont 910 DSC Cell) to determine relative crystallization rate by measuring the temperature of the melting point maximum, $T_M$, during the heating cycle, and the maximum of the crystallization exotherm, $T_C$, during the cooling cycle. The smaller the $T_M$-$T_C$ difference, the higher the relative rate of crystallization. This analysis involves heating a polymer sample at a rate of 20° C./min under nitrogen atmosphere to 265° C., maintaining this temperature for 1 minute followed by cooling to 100° C. at a cooling rate of 20° C./min. The results are shown in Table 1.

TABLE 1

| Composition | Weight % Sodium Salt | Melt Index, 230° C. g/10 min. | Melt Index 250° C. g/10 min. | Melt Stability Index 250° C. | DSC $T_M$, °C. | DSC $T_C$, °C. |
|---|---|---|---|---|---|---|
| 1A | 2 | 0.3 | 3.1 | 0.8 | 199 | 168 |
| 1B-1 | 2 | 0.2 | 1.0 | 2 | 199 | 172 |
| 1B-2 | 1 | 0.2 | 1.4 | 0.9 | 199 | 171 |
| 1B-3 | 0.5 | 3.0 | 10.8 | 0.6 | 202 | 177 |
| 1C | 2 | 0.3 | 1.8 | 0.6 | 200 | 171 |
| 1D | 2 | 0.2 | 1.9 | 0.4 | 200 | 170 |
| 1E | 2 | 0.3 | 1.8 | 0.9 | 200 | 171 |
| 1F | 2 | 0.3 | 1.3 | 1.0 | 198 | 172 |
| 1G* | 2 | 19 | 39 | Unstable | 201 | 165 |
| 1H* | — | 11.1 | 18.9 | 0.5 | 201 | 165 |

*Control

It is clear that all of the sodium salts of the phenolic compounds effectively reduce the melt index and increase the relative rate of crystallization of Copolyester A in comparison with unmodified Copolyester A (Composition 1H). Control 1G in which phloroglucinol is used as such rather than as its sodium salt is unstable and shows no increase in crystallization rate relative to the unaltered Copolyester A.

EXAMPLE 2

Alkali metal salts of other phenolic compounds, all having pK$_a$ values greater than 5, were prepared by the mixing procedure described above and were blended with copolyester A as described previously to give the compositions shown below. Results are shown in Table 2.

2A Disodium (bisphenol A) + Copolyester A
2B Dipotassium (bisphenol AF) + Copolyester A
2C Disodium (tetrabromobisphenol A) + Copolyester A
2D Tetrasodium (resorcinol sulfide) + Copolyester A
2E Sodium salt of phenol-formaldehyde resin[1] + Copolyester A For control purposes 2F Copolyester A subjected to the same mixing cycle, in the absence of any modifier
2G Sodium salt of stearic acid + Copolyester A.

[1] Oil soluble phenolic resin having a number average molecular weight of about 1200; "Resinox" 753, sold by Monsanto Chemical Company.

TABLE 2

| Composition | Weight % Salt | Melt Index, 230° C. g/10 min. | Melt Index 250° C. g/10 min. | Melt Stability Index 250° C. | DSC $T_M$, °C. | DSC $T_C$, °C. |
|---|---|---|---|---|---|---|
| 2A-1 | 2 | 0.5 | 4.6 | 0.9 | 199 | 177 |
| 2A-2 | 4 | 0.7 | 2.7 | 3.8 | 200 | 180 |
| 2B | 2 | — | 9.9 | 0.75 | 202 | 180 |
| 2C | 2 | 0.7 | 5.2 | 0.3 | 202 | 174 |
| 2D | 2 | 0.1 | 0.6 | 2.0 | 197 | 168 |
| 2E | 4 | 0.8 | 4.5 | 1.1 | 199 | 178 |
| 2F* | — | 11.1 | 18.9 | 0.5 | 201 | 165 |
| 2G* | 2 | 3.0 | 21.5 | 0.5 | 197 | 181 |

*Control

All of the salts of phenolic compounds are effective in reducing melt index and increasing crystallization rate relative to Composition 2F which is unmodified Copolyester A. Composition 2G which is representative of the prior art improves crystallization rate but causes decomposition as evidenced by a higher melt index at 250° C. than that of unmodified Copolyester A.

EXAMPLE 3

The following compositions were prepared from Copolyester B according to the mixing procedure described above.

3A Na$_3$(phloroglucinol) + Copolyester B

For Control purposes

3B Copolyester B subjected to the same mixing cycle in the absence of any modifier
3C Unneutralized phloroglucinol + Copolyester B The resulting compositions are evaluated by measuring the melt flow index at 240° C. Additionally each composition is characterized by thermal analysis as described in Example 1. Results are shown in Table 3.

TABLE 3

| Composition | Weight % Modifier | Melt Index, 240° C. g/10 min. | DSC $T_M$, °C. | DSC $T_C$, °C. |
|---|---|---|---|---|
| 3A | 2 | 12.5 | 222 | 201 |
| 3B* | — | 15.5 | 225 | 147 |
| 3C* | 2 | 69.5 | 227 | 180 |

Composition 3A exhibits a decrease in melt index and an increase in crystallization rate relative to Composition 3B which is unmodified Copolyester B. Control 3C which is modified by the addition of phloroglucinol as such degrades rapidly.

EXAMPLE 4

Commercially available salts of a thermoplastic resin are blended with Copolyesters A and B by the mixing procedure described above. A description of the base resin and its salts follow:

Unneutralized Resin—Thermoplastic resin which is a by-product of pine wood rosin manufacture containing about 60% phenolic compounds and 40% rosin acids. Available from Hercules Company, Wilmington. Del. as "Vinsol" resin.

Resin Salt A—The sodium salt of "Vinsol" resin available from Hercules Company as "Vinsol" NVX.

Resin Salt B—A mixture of "Vinsol" resin and 5-10% fatty acids in the form of their sodium salts. Available from Hercules Company as "Vinsol" MM.

The compositions prepared are listed below and the results of measurements on these compositions are given in Table 4.

4A Resin Salt A + Copolyester A
4B Resin Salt B + Copolyester A
4C Resin Salt A + Copolyester B Controls 4D Unneutralized Resin + Copolyester A
4E Copolyester A subjected to the same mixing cycle in the absence of any modifier.

TABLE 4

| Composition | Weight % "Vinsol" Resin | Melt Index, 230° C., g/10 min After 5' | Melt Index, 230° C., g/10 min After 30' | DSC $T_M$, °C. | DSC $T_C$, °C. |
|---|---|---|---|---|---|
| 4A | 4 | 1.4 | 2.9 | 206 | 181 |
| 4B | 4 | 1.0 | 0.8 | 209 | 181 |
| 4C | 4 | 0.8** | — | 220 | 203 |
| 4D* | 4 | 12.4 | 18 | 203 | 164 |
| 4E* | — | 10.2 | 12.9 | 204 | 165 |

*Control
**Melt index at 240° C.

The results show improvements in melt index and crystallization rate in the presence of Resin Salts A and B, which contain salts of phenolic compounds, relative to the Unneutralized Resin and unmodified Copolyester A.

EXAMPLE 5

The retention of physical properties upon heat aging (7 days/121° C.) was determined for the compositions listed below:

5A "Vinsol" NVX + Copolyester A
5B Na$_4$(3,4,5-trihydroxybenzoic acid) + Copolyester A For control purposes 5C Copolyester A The results obtained are shown in Table 5.

Compositions 5A and 5B, while displaying reduced tensile strength and elongation display increased 100% modulus, relative to the control 5C. After heat aging Compositions 5A and 5B have equivalent retention of physical properties (% retention relative to original properties) compared to the control 5C.

TABLE 5

| Properties | Composition (weight % modifier) | | |
|---|---|---|---|
| | 5A (4%) | 5B (4%) | 5C (none) |
| Original Properties | | | |
| Tensile Strength, MPa | 23.3 | 19.0 | 41.4 |
| Elongation at Break % | 520 | 320 | 750 |
| 100% Modulus, MPa | 16.7 | 16.6 | 14.8 |
| Heat Aging: 7 days/121° C. (% Retention) | | | |
| Tensile Strength, MPa | 19.7 (84%) | 17.6 (93%) | 31.7 (77%) |
| Elongation at Break % | 440 (85%) | 225 (70%) | 635 (85%) |
| 100% Modulus, MPa | 17.9 (107%) | 17.3 (104%) | 15.9 (107%) |

EXAMPLE 6

The following compositions are prepared by the mixing procedure described above.

6A 2% disodium salt of resorcinol, $pK_a 25° 9.4 + 1\%$ 4,4'-bis($\alpha,\alpha$-dimethylbenzyl)-diphenylamine stabilizer + Copolyester A 6B 2% disodium salt of bisphenol A, $pK_a 25° > 5$ + Copolyester A 6C 2% tetrasodium salt of resorcinol sulfide, $pK_a 25° > 5$ + Copolyester A Control 6D Copolyester A subjected to the same mixing cycle in the absence of any modifier.

The compositions are characterized by measuring melt index and melt tension. Melt tension is determined by drawing the extrudate of a predried polymer at a constant rate of 3.05 m/min. from an Instron capillary rheometer operated at a temperature 30° C. above the melting point of the copolyester and using a die having an outside diameter of 1 mm length-to-diameter ratio of 4 and 90° entrance angle with Instron cross head speed of 5 mm/min. (The polymer is predried for 1 hour at 100° C. in a vacuum oven before testing.) Results are shown in Table 6.

TABLE 6

| Compositon | Melt Index, 230° C. g/10 min | Melt Tension, 225° C. grams |
|---|---|---|
| 6A | 0.11 | 6.2 |
| 6B | 0.50 | 3.7 |
| 6C | 0.14 | 6.9 |
| 6D* | 11 | 0.4–0.6 |

*Control

The high melt tensions of Compositions 6A, 6B and 6C make them much more suitable for blow molding than is unmodified control Composition 6D.

EXAMPLE 7

The following compositions are prepared by the mixing procedure described above.

7A-1 2 weight % sodium phenolate, $pK_a 25° 10$ + Copolyester A 7A-2 Copolyester A subjected to the same mixing cycle in the absence of any modifier.

7B-1 2 weight % Na$_4$(Resorcinol Sulfide), $pK_a 25° > 5$ + Copolyester C 7B-2 Copolyester C subjected to the same mixing cycle in the absence of any modifier.

Melt index measurements and thermal analysis is carried out for each of the compositions. The results are given in Table 7.

TABLE 7

| Composition | Melt Index g/10 min | DSC $T_M$, °C. | $T_C$, °C. |
|---|---|---|---|
| 7A-1 | 1.5[c] | 201 | 182 |
| 7A-2[a] | 11.7[c] | 204 | 164 |
| 7B-1 | 2.7[d] | 178 | 146 |
| 7B-2[b] | 9.7[d] | 171 | 117 |

[a]Control for 7A-1
[b]Control for 7B-1
[c]at 230° C.
[d]at 210° C.

Both Compositions 7A-1 and 7B-1 show clear improvements in melt index and crystallization rate relative to their respective control compositions.

EXAMPLE 8

A composition is prepared by mixing 2 weight % of the disodium salt of Bisphenol A with Copolyester B. Blending is performed by the mixing procedure given hereinbefore. Melt index measurements and thermal analysis are carried out on the sample as well as on a control of unmodified Copolyester B. The following results are obtained.

TABLE 8

| | Melt Index, 240° C., g/10 min | | DSC | |
|---|---|---|---|---|
| | After 5 min | After 30 min | $T_M$, °C. | $T_C$, °C. |
| Modified Copolyester B | 24.9 | 10.7 | 222 | 189 |
| Unmodified Copolyester B | 25.1 | 34.2 | 220 | 139 |

EXAMPLE 9

A copolyester elastomer is prepared by reacting the following ingredients substantially by the polycondensation procedure described for the preparation of Copolyester A.

| | |
|---|---|
| dimethyl terephthalate | 573 parts |
| dimer acid ("Empol" 1010) | 319 parts |
| 1,4-butanediol | 475 parts |
| 4,4'-bis($\alpha,\alpha$-dimethylbenzyl)- diphenylamine | 12 parts |
| tetrabutyl titanate | 3 parts |

The dimer acid-containing copolyester is mixed with 2.5 weight % of the disodium salt of Bisphenol A by the mixing procedure described hereinbefore. Melt index measurements are carried out on the sample as well as a control of the unmodified copolyester. The following results are obtained.

TABLE 9

| Compound | Melt Index at 230° C., g/10 min | |
|---|---|---|
| | After 5 min | After 30 min |
| Modified copolyester | 3.0 | 0.2 |
| Unmodified copolyester | 15.7 | 18.3 |

I claim:

1. A thermoplastic copolyester elastomer composition comprising (A) a copolyester consisting essentially of a multiplicity of long-chain ester units and short-chain ester units joined through ester linkages, said long-chain ester units selected from the group consisting of units represented by the formula (Ia), formula (Ib) and combinations thereof

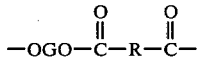
(Ia)

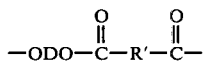
(Ib)

and said short-chain ester units being represented by formula (II)

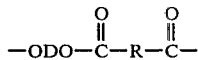
(II)

where G is a divalent radical remaining after the removal of hydroxyl groups from at least one long-chain glycol having a melting point of less than about 55° C. and a number average molecular weight of about 400–4000, R is a divalent radical remaining after the removal of carboxyl groups from at least one dicarboxylic acid having a molecular weight less than about 300, R' is a divalent radical remaining after the removal of carboxyl groups from dimer acid, D is a divalent radical remaining after the removal of hydroxyl groups from at least one aliphatic diol having a molecular weight less than about 250, with the proviso that at least about 70 mole percent of the D radicals are either ethylene radicals or 1,4-butylene radicals and at least about 70 mole percent of the R radicals are 1,4-phenylene radicals, said short-chain ester units being present in an amount of about 15–95 percent by weight of said copolyester; and (B) about 0.1–10 percent by weight, based on the weight of the total composition, of at least one alkali metal salt of a phenolic compound having a $pK_a25°$ greater than 5 and an equivalent weight of less than about 300 per phenolic hydroxyl group.

2. A composition of claim 1 wherein the phenolic salt is a salt of polyhydric phenol.

3. A composition of claims 1 or 2 wherein the phenolic salt has an equivalent weight of less than about 150 per phenolic hydroxyl group.

4. A composition of claim 1 or 2 wherein the phenolic salt is a salt of resorcinol, bisphenol A, phloroglucinol, resorcinol sulfide or a phenol-formaldehyde resin.

5. A composition of claim 1 or 2 where the phenolic salt is a sodium salt.

6. A composition of claim 1 containing about 1–5 weight percent phenolic salt.

7. A composition of claim 1 wherein said long-chain ester units are represented by the Formula

(Ia)

8. A composition of claim 1 wherein said long chain ester units are represented by the Formula

(Ib)

9. A composition of claim 7 where G is a divalent radical obtained by removing the hydroxyl groups from poly(tetramethylene oxide) glycol having a number average molecular weight of about 600–2000 or ethylene oxide-capped poly(propylene oxide) glycol having a number average molecular weight of about 1500–2800 and an ethylene oxide content of 15–35% by weight.

* * * * *